United States Patent
Oton et al.

(10) Patent No.: US 11,287,714 B2
(45) Date of Patent: Mar. 29, 2022

(54) WAVELENGTH TUNABLE OPTICAL FILTER AND METHOD FOR SWITCHING AND ADJUSTING THEREOF

(71) Applicants: NIKON CORPORATION, Minato-ku (JP); Essilor International, Charenton-le-Pont (FR)

(72) Inventors: Eva Oton, Minato-ku (JP); Estelle Netter, Charenton-le-Pont (FR)

(73) Assignees: NIKON CORPORATION, Minato-ku (JP); Essilor International, Charenton-le-Pont (FR)

( * ) Notice: Subject to any disclaimer, the term of this patent is extended or adjusted under 35 U.S.C. 154(b) by 3 days.

(21) Appl. No.: 16/500,278

(22) PCT Filed: Apr. 3, 2017

(86) PCT No.: PCT/IB2017/000494
§ 371 (c)(1),
(2) Date: Oct. 2, 2019

(87) PCT Pub. No.: WO2018/185509
PCT Pub. Date: Oct. 11, 2018

(65) Prior Publication Data
US 2021/0116737 A1    Apr. 22, 2021

(51) Int. Cl.
*G02F 1/137* (2006.01)
*G02C 7/10* (2006.01)
(Continued)

(52) U.S. Cl.
CPC ......... *G02F 1/13718* (2013.01); *G02C 7/101* (2013.01); *G02F 1/1337* (2013.01);
(Continued)

(58) Field of Classification Search
CPC ... G02F 1/13718; G02F 2201/343; G02F 1/29
See application file for complete search history.

(56) References Cited

U.S. PATENT DOCUMENTS

| 5,877,826 A * | 3/1999 | Yang ................. | C09K 19/0208 349/36 |
| 2006/0098296 A1* | 5/2006 | Woodgate ............ | H04N 13/305 359/642 |

(Continued)

OTHER PUBLICATIONS

International Search Report dated Dec. 15, 2017 in PCT/IB2017/000494, 3 pages.

(Continued)

*Primary Examiner* — Jessica M Merlin
(74) *Attorney, Agent, or Firm* — Oblon, McClelland, Maier & Neustadt, L.L.P.

(57) ABSTRACT

A wavelength tunable optical filter and a method for switching and adjusting the wavelength tunable optical filter. The optical filter includes a liquid crystal cell comprising a cholesteric liquid crystal mixture inserted between two electrodes configured to apply a voltage, the cholesteric liquid crystal mixture comprising a chiral dopant and a dual frequency liquid crystal host material, the liquid crystal cell having a reference Bragg reflection wavelength in the spectral range between 300 nm and 900 nm, and the liquid crystal cell having a first Bragg reflection wavelength, when the applied voltage is modulated at a frequency comprised in an intermediate frequency range which is above a cross-over frequency and below a high frequency limit, the first Bragg reflection wavelength being different from the reference Bragg reflection wavelength and the cholesteric liquid crystal mixture being non-scattering both in the reference Bragg reflection mode and in the first Bragg reflection mode.

18 Claims, 4 Drawing Sheets

(51) Int. Cl.
*G02F 1/1337* (2006.01)
*G02F 1/1343* (2006.01)
(52) U.S. Cl.
CPC .. *G02F 1/134309* (2013.01); *G02F 2201/343* (2013.01); *G02F 2202/06* (2013.01); *G02F 2203/055* (2013.01)

(56) References Cited

U.S. PATENT DOCUMENTS

2008/0030635 A1* 2/2008 Chien ................ G02F 1/13718
349/33
2015/0131039 A1* 5/2015 Wang .................. G02F 1/1392
349/106

OTHER PUBLICATIONS

Furumi, S. et al. "Phototunable photonic bandgap in a chiral liquid crystal laser device" Applied Physics Letters, vol. 84, No. 14, 2004, 4 pages.

Bisoyi, H.K. et al. "Light-Directing Chiral Liquid Crystal Nanostructures: From 1D to 3D" Accounts of Chemical Research, 2014, 12 pages.

Hunag, Y. et al. "Optical filter with tunable wavelength and bandwidth based on cholesteric liquid crystals" Optics Letters, vol. 36, No. 23, 2011, 3 pages.

* cited by examiner

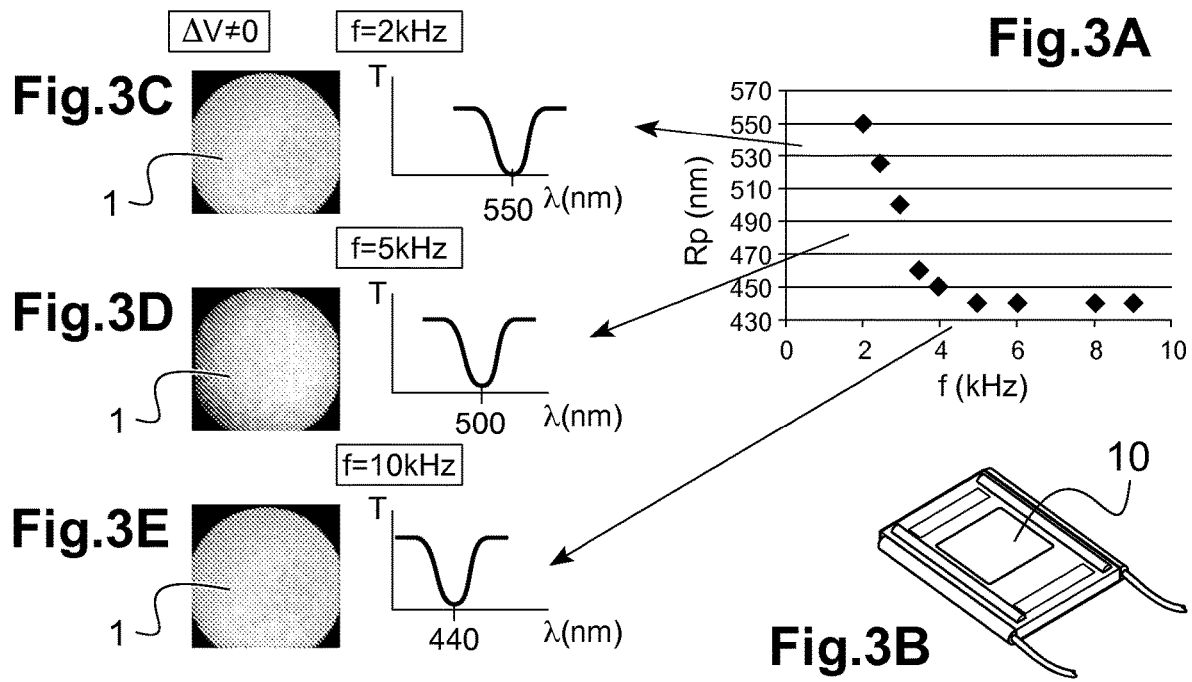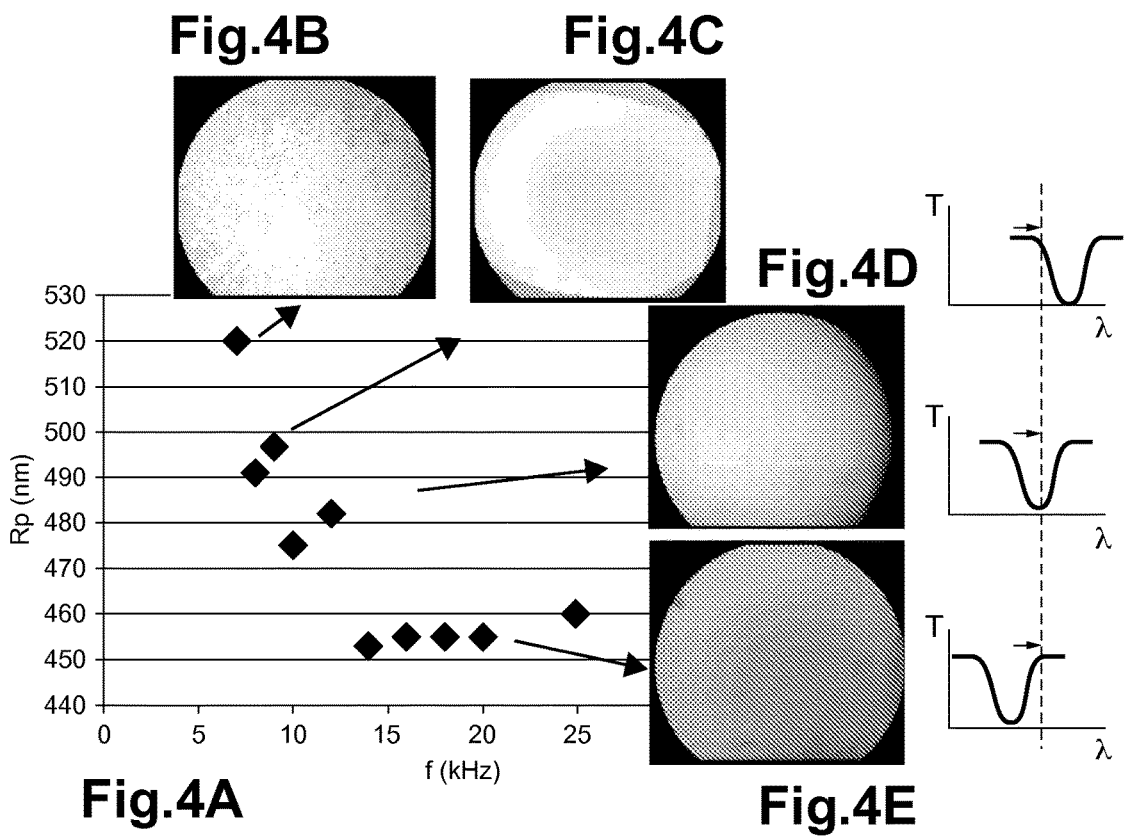

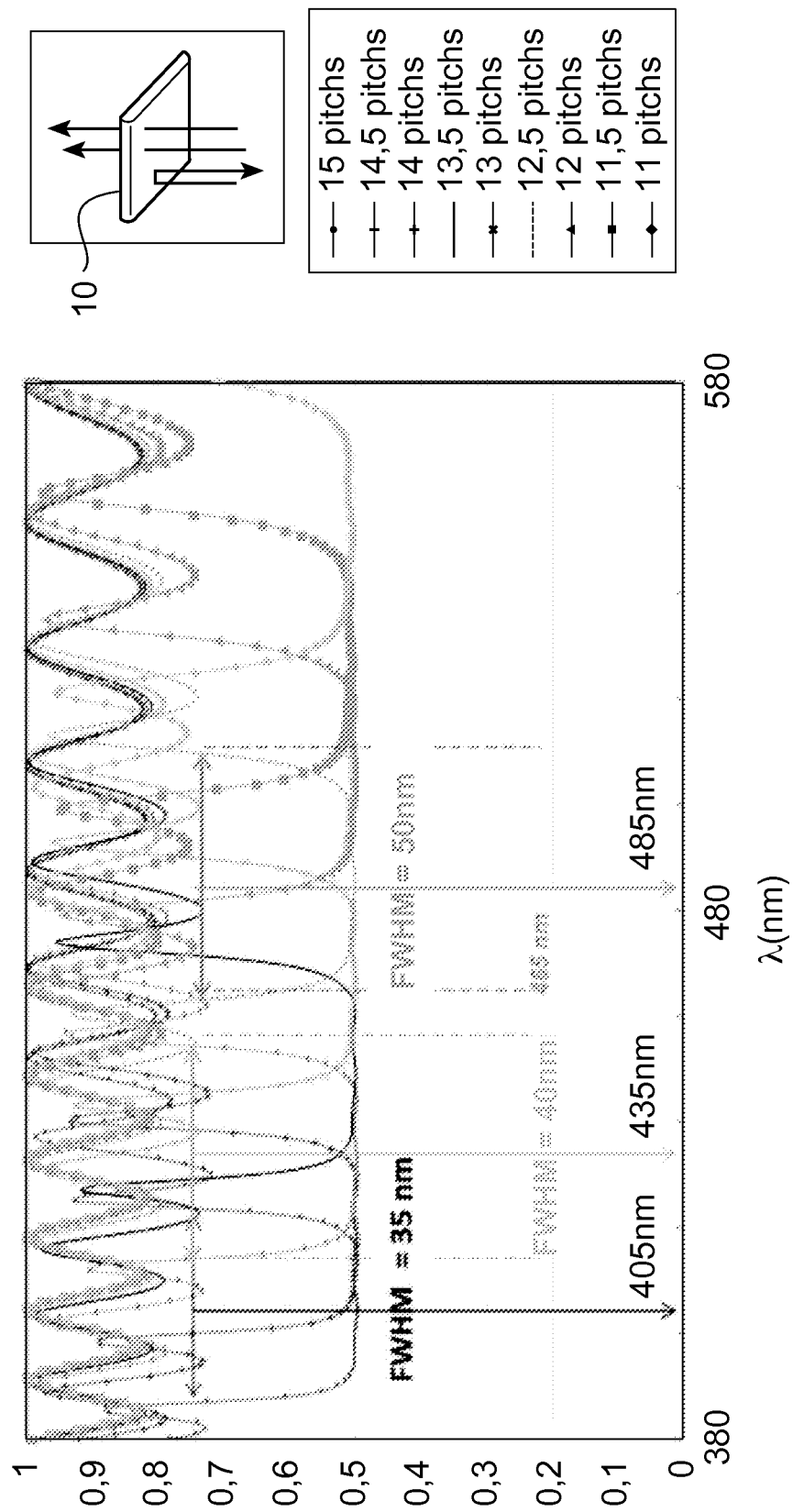

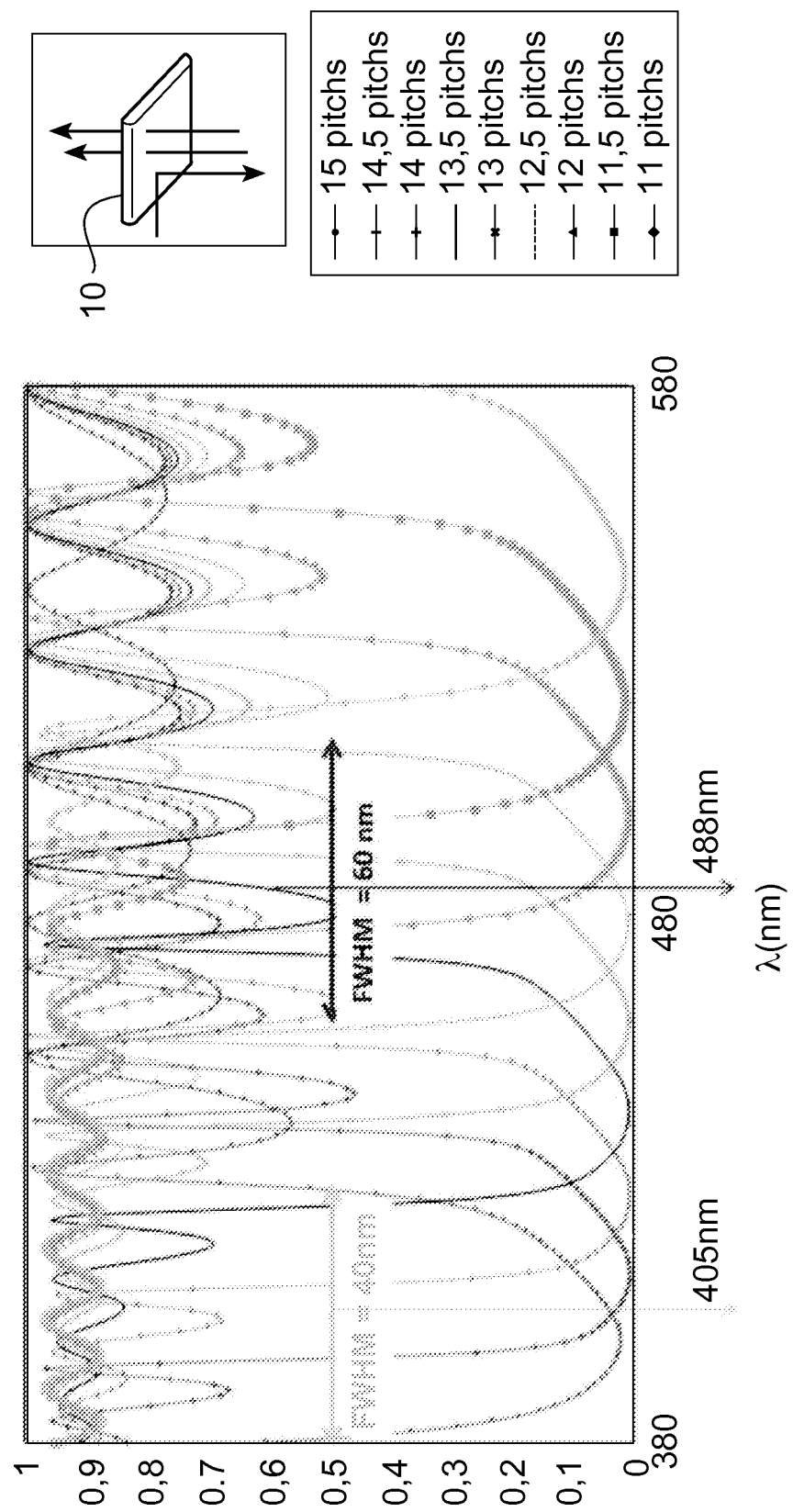

WAVELENGTH TUNABLE OPTICAL FILTER AND METHOD FOR SWITCHING AND ADJUSTING THEREOF

TECHNICAL FIELD OF THE INVENTION

The invention relates to a wavelength tunable optical filter.

In particular, the invention relates to a wavelength tunable optical reflection filter having a narrow bandwidth and which is tunable over a broad spectral range.

BACKGROUND INFORMATION AND PRIOR ART

Spectrally selective optical filtering is used in many applications including metrology tools, such as microscopy apparatus, and spectacle lenses.

Numerous documents describe passive optical filters, such as notch filters, designed for filtering selectively a determined wavelength within a narrow spectral bandwidth. Passive notch filters are generally based on multilayer films. Passive notch filters reflect a determined wavelength and transmit the other wavelengths. The band-stop wavelength may be adjusted within a narrow spectral range of a few tens of nanometers by varying the angle of incidence.

However, for different applications, there is a need for a wavelength tunable band-stop optical filter which is tunable over a broader spectral range.

In particular, there is a need for an active therapeutic filter tunable in the blue and UV spectral ranges.

It is known that high-energy visible light comprised between 380 nanometers (nm) and 500 nm (blue light) induces cumulative damage to the retina of the human eye, and particularly the blue-violet light comprised between 415 nm and 455 nm, or bad blue range. However, it was also demonstrated that the spectral range from 465 nm to 495 nm, or good blue range, has some non-visual functions for the human body related to sleep, mood, corporal temperature or psychomotricity. Thus, passive optical filters extending over the whole blue-violet range might affect adversely circadian rhythms. Moreover, color perception is also affected by using a filter extending in the blue range.

Thus there is a need for a wearer of ophthalmic lenses, to dispose of a therapeutic filter having a UV-only cut mode, for ensuring UV protection while providing an acceptable color perception. For efficient synchronization of circadian rhythms, exposure to the good blue range is required only for limited periods and at specific hours. Thus the exposure to the so-called good blue range gives functions positive effect in daytime, but those effects can be negative in night time. Thus, there is a need for a therapeutic filter having a selective spectral bandwidth that can be shifted as desired in the blue range from bad blue to good blue.

In the field of micro-spectrometry, in particular in fluorescence microscopy apparatus, different passive dichroic filters are generally required for detection of different dyes. It is desirable to arrange only one or two tunable dichroic filters so as to switch the selective spectral band as a function of the excitation laser wavelength for example from 405 nm to 488 nm, 560 nm and/or 640 nm.

Many active optical filter devices are based on liquid crystal technology. Different types of liquid crystals are used for manufacturing band-stop filters operating in reflection. In particular, cholesteric liquid crystals (CLC) comprise a liquid crystal host and a chiral dopant resulting in a CLC planar structure defined by a helix pitch and axis. Cholesteric liquid crystal devices can be tuned to reflect specific wavelengths for application to color filters.

The photonic band gap of a CLC device is generally controlled by adjusting the liquid crystal host and/or chiral parameters, or by adjusting external factors such as temperature (S. Furumi et al., "Phototunable photonic bandgap in a chiral liquid crystal laser device," Appl. Phys. Lett. 84, 2491 (2004)), pressure, light irradiation (Li et al., "Light-directing chiral liquid crystal nanostructures: from 1D to 3D". Acc. Chem. Res. (2014)), or electric field (Zhou, et al., "Optical filter with tunable wavelength and bandwidth based on cholesteric liquid crystal", Opt. Express 19, 8032 (2011)).

However, an electrically driven CLC filter device generally operates as a switch between only two states (or switchable-only device), meaning that there are only two stable states, ON and OFF, respectively with 100% and 0% transmission coefficients, for circular polarized light. For switching off the reflection peak with frequency only, the applied frequencies are in the high frequency range (MHz). Addressing with different high applied frequencies can also allow for a shift in the Bragg reflection wavelength but within a very limited spectral reflection range. When switching between the On and Off states, CLC devices exhibit intermediate states. In these intermediate states, the CLC devices present a focal conic structure which leads to undesired scattering.

CLC devices are also available in polymer stabilized forms, such as helical polymer nano-dispersed liquid crystals or blue phase liquid crystals (BPLC). However, the polymer-based CLC versions require high threshold voltage and also exhibit undesired scattering.

SUMMARY OF THE INVENTION

The above objects are achieved according to the present disclosure by providing an optical filter.

According to the invention, the optical filter comprises a liquid crystal cell comprising two electrodes facing each other, each of the two electrodes being covered by an alignment layer, and separated by a cell gap and a cholesteric liquid crystal mixture inserted between the two electrodes; the liquid crystal cell being configured to apply a voltage (V) between the two electrodes; the cholesteric liquid crystal mixture comprises a chiral dopant and a dual frequency liquid crystal host material, the dual frequency liquid crystal host material having a cross-over frequency (fc), the liquid crystal cell having a reference Bragg reflection mode with a planar structure and a reference Bragg reflection wavelength in the spectral range between 300 nm and 900 nm when the applied voltage is null and when the applied voltage is modulated at a frequency higher than a high frequency limit, and wherein the liquid crystal cell has a first Bragg reflection mode with an unwound planar structure and a first Bragg reflection wavelength, when the applied voltage is higher than a threshold voltage and the applied voltage is modulated at another frequency comprised in an intermediate frequency range which is above the cross-over frequency (fc) and below the high frequency limit ($f_H$), the first Bragg reflection wavelength being different from the reference Bragg reflection wavelength.

This optical filter provides an electrically controlled wavelength tunable band-stop optical filter. Moreover, this optical filter is electrically switchable.

According to a particular and advantageous aspect of the present disclosure, the dual frequency liquid crystal host material has a refractive index birefringence lower than 0.2 in the visible range.

According to another particular and advantageous aspect, the chiral dopant has a helical twisting power higher than or equal to 100 µm$^{-1}$.

Advantageously, the dual frequency liquid crystal host material has a cross-over frequency lower than 10 kilohertz (kHz), preferably lower than 5 kHz, and a threshold voltage lower than about 100 V, the cholesteric liquid crystal mixture having a high frequency range, the high frequency range extending above the high frequency limit ($f_H$), the high frequency limit ($f_H$) being lower than 100 kHz.

According to a preferred embodiment, the dual frequency liquid crystal host material comprises W-1978C or W-1831A, distributed by the Military University of Technology of Poland, and/or the chiral dopant comprises R-5011, also known as (13bR)-5,6-Dihydro-5-(trans-4-propylcyclohexyl)-4H-dinaphtho[2,1-f:1',2'-h][1,5]dioxonin of CAS number 944537-61-5.

According to another embodiment the liquid crystal host is W-1831A distributed by MUT, Military University of Technology, Warsaw, Poland and/or the chiral dopant comprises R-5011. The chemical formula of R-5011 is as follows:

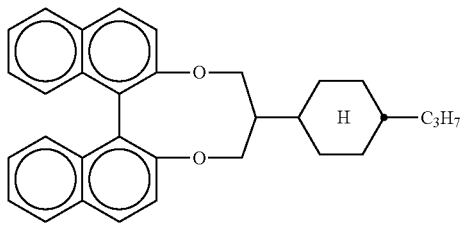

According to a particular and advantageous aspect of the present disclosure, the liquid crystal cell is adapted to be controlled by a controller, so as to operate at least in the first Bragg reflection mode under an applied voltage above the threshold voltage, modulated at a first predetermined frequency comprised in the intermediate frequency range, the liquid crystal mixture having a planar structure in a high frequency mode wherein the applied voltage is higher than the threshold voltage and the frequency of applied voltage is in the high frequency range, the liquid crystal cell in the high frequency mode having a Bragg reflection wavelength equal to the reference Bragg reflection wavelength.

In a particular embodiment, an optical filter device comprises a first optical filter as disclosed herein, the first optical filter having a predetermined first Bragg reflection wavelength and a second optical filter as disclosed herein, the second optical filter having a predetermined second Bragg reflection wavelength, the first optical filter and the second optical filter being arranged optically in series.

According to variants of this embodiment, the first optical filter and the second optical filter differ by optical handedness and/or by a value of their respective Bragg reflection wavelengths.

The invention also concerns an optical device comprising an optical filter according to any embodiment disclosed herein and a controller configured to control the optical filter at least in the first Bragg reflection mode and, respectively, in one of an off mode and of a high frequency mode according to which, in the off mode, the controller applies no voltage to the electrodes, the liquid crystal cell having, in the off mode, the reference Bragg reflection wavelength, and, respectively, in the high frequency mode, the controller applies a voltage above the threshold voltage that is modulated at a frequency in the high frequency range, the liquid crystal cell having, in the high frequency mode, a Bragg reflection wavelength of similar value than the reference Bragg reflection wavelength and wherein, in the first Bragg reflection mode, the controller applies a voltage above the threshold voltage that is modulated at a first predetermined frequency comprised in the intermediate frequency range so that the liquid crystal cell has a first predetermined Bragg reflection wavelength.

According to a particular and advantageous aspect, the controller is further configured to control the optical filter in the first Bragg reflection mode, and wherein the controller applies a voltage above the threshold voltage modulated at a second predetermined frequency in the intermediate frequency range so that the liquid crystal cell has a second predetermined Bragg reflection wavelength, the second predetermined frequency being different from the first predetermined frequency, and the second Bragg reflection wavelength being different from the first predetermined Bragg reflection wavelength.

Preferably, in the off mode, the reference Bragg reflection wavelength is in the UV range and, respectively, in the first Bragg reflection mode, the first Bragg reflection wavelength is in the 380-780 nm range, for example in the 400-460 nm range.

According to a particular and advantageous embodiment, the optical device further comprises an optical component having an optical power arranged in series with the optical filter.

Preferably, the optical device comprising a pair of eyeglasses or a lens.

The present disclosure also provides a method for tuning a reflection wavelength in an optical filter comprising the following steps:

providing a cholesteric liquid crystal mixture in sandwich between two electrodes, each of the two electrodes being covered with an alignment layer in a liquid crystal cell, the cholesteric liquid crystal mixture comprising a chiral dopant and a dual frequency liquid crystal host material, the dual frequency liquid crystal host material having a threshold voltage ($V_{th}$) and a cross-over frequency ($f_c$), defining an intermediate frequency range, above the cross-over frequency ($f_c$), where the liquid crystal mixture has a dielectric anisotropy that varies with frequency and is negative, and a high frequency range above the intermediate frequency range where the liquid crystal mixture has a dielectric anisotropy that is independent from frequency and negative, the liquid crystal cell having a reference Bragg reflection wavelength in the 300-900 nm range, and, in an off mode, applying to the electrodes no voltage or a voltage modulated at a frequency in the high frequency range, such that the liquid crystal cell has the reference Bragg reflection wavelength while the cholesteric liquid crystal mixture is non-scattering in transmission at other wavelengths;

in a first predetermined mode, applying a voltage above the threshold voltage modulated at a first frequency in the intermediate frequency range such that the liquid crystal cell has a first Bragg reflection wavelength that is a function of the first frequency while the cholesteric liquid crystal mixture is non-scattering in transmission at other wavelengths, the first Bragg reflection wavelength being different from the reference Bragg reflection wavelength.

According to a particular aspect, the method further comprises one of the two following steps:

- in a low frequency mode, applying a voltage higher than the threshold voltage modulated at a frequency in a low frequency range lower than the cross-over frequency so as to switch the liquid crystal mixture into a homeotropic structure that has no Bragg reflection while the cholesteric liquid crystal mixture is non-scattering in transmission in the low frequency mode;
- in a second predetermined mode, applying a voltage higher than the threshold voltage modulated at second frequency in the intermediate frequency range such that the liquid crystal cell has a second Bragg reflection wavelength that is a function of the second frequency while the cholesteric liquid crystal mixture is non-scattering in transmission at other wavelengths, the second Bragg reflection wavelength being different from both the first Bragg reflection wavelength and the reference Bragg reflection wavelength.

BRIEF DESCRIPTION OF THE DRAWINGS

FIG. 3A shows measurements of the maximum reflection peak wavelength as a function of the applied frequency (f) under a fixed applied voltage for unpolarized light under normal incidence of an optical filter according to an embodiment based on DFLC material W-1978C (FIG. 3B);

FIGS. 3C, 3D and 3E show in inserts the corresponding microscope images in reflection and spectral transmission curves of the liquid crystal optical filter at various modulation frequencies;

FIG. 4A shows measurements of the maximum reflection peak wavelength as a function of the applied frequency (f) under a fixed applied voltage for unpolarized light under normal incidence of an optical filter according to another exemplary embodiment based on DFLC material W-1831A; FIGS. 4B, 4C, 4D and 4E show in inserts the corresponding microscope images in reflection and spectral transmission curves of the liquid crystal optical filter at various modulation frequencies;

FIG. 5 shows simulations of transmittance curves as a function of wavelength of an ideal liquid crystal cell for several number of pitches (from 15 to 11 by step of 0.5) and for unpolarized light under normal incidence;

FIG. 6 shows simulation of transmittance curves as a function of wavelength of another ideal liquid crystal cell with number of pitches values (from 15 to 11 by step of 0.5) for circular polarized light under 45 degrees angle of incidence.

DETAILED DESCRIPTION OF EXAMPLE(S)

Figure 1A:
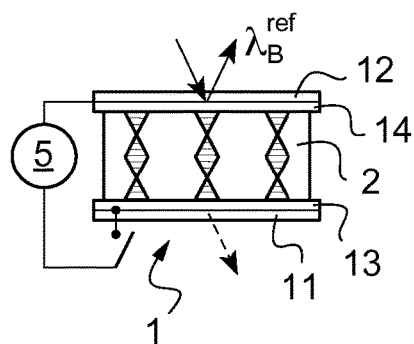
FIG. 1 schematically shows a cross-section of an optical filter device based on a liquid crystal cell and a controller in different operating conditions, respectively, FIG. 1A in an off mode, FIG. 1B in a first Bragg reflection mode, and FIG. 1C in a low frequency mode for an applied voltage above the threshold voltage.

The present disclosure concerns a wavelength selective optical filter adapted for tuning the selected wavelength within a determined spectral range. The optical filter may operate in reflection and/or transmission. The wavelength selection is performed by shifting a reflection peak from an initial or reference wavelength towards longer wavelengths.

Device

More precisely, the present disclosure relates to an active optical filter based on liquid crystals. The optical filter comprises at least one liquid crystal cell.

FIG. 1 schematically shows an exemplary cross section view of an optical filter based on a liquid crystal cell 1 and a controller 5 in different operating conditions.

The liquid crystal cell 1 comprises a first plate 11 and a second plate 12. The first plate 11 and the second plate 12 are made of a transparent material over the visible spectral range. The liquid crystal cell 1 comprises a first electrode 13 arranged on the first plate 11 and a second electrode 14 arranged on the second plate 12 of the liquid crystal cell 1. Preferably, the first plate 11 is parallel to the second plate 12. The first electrode 13 is placed opposite to the second electrode 14 of the liquid crystal cell 1. The first electrode 13 and the second electrode 14 are preferably transparent conductive electrodes, consisted of an indium-tin-oxide (ITO) layer for example. The liquid crystal cell 1 comprises a first alignment structure arranged on the surface of the first electrode 13 and a second alignment structure arranged on the surface of the second electrode 14 for determining the orientation of the liquid crystal molecules present near the first electrode 13 and those that are near the second electrode 14, and therefore organizing the bulk of the cell.

A controller 5 is adapted to be connected to the first electrode 13 and second electrode 14. The controller 5 is adapted to generate an applied voltage between the first electrode 13 and second electrode 14. The applied voltage may have a variable amplitude. Moreover, the controller is adapted to modulate the applied voltage at a selectable frequency. The range of modulation frequency extends for example from 0 Hz to a few kilohertz or a few tens of kilohertz and optionally in a high frequency MHz range.

A liquid crystal mixture 2 fills the liquid crystal cell 1 between the first electrode 13 and the second electrode 14. Micro sized spacers may be included in the LC cell so as to ensure a constant cell gap across the liquid crystal cell. In other words, the liquid crystal cell 1 comprises a liquid crystal layer of thickness d. Generally, the LC layer has a thickness comprised between 2 μm and 10 μm.

Preferably, the alignment structures are alignment layers. For example a first alignment layer is formed on the first electrode 13 and a second alignment layer is formed on the second electrode 14. These alignment layers consist for example of a polyimide layer rubbed to induce an orientation of the liquid crystal molecules. The second alignment layer has preferably an alignment direction that is antiparallel to an alignment direction of the first alignment layer. The first alignment layer and the second alignment layer are separated by a cell gap, noted d. It is to be noted, that while anti-parallel orientation of the alignment layer is preferred, the invention works also with parallel or perpendicular orientations.

More precisely, the liquid crystal mixture 2 comprises a Dual Frequency Liquid Crystal (DFLC) host material. A DFLC material has a dielectric anisotropy of a first sign over a low frequency range and a dielectric anisotropy of opposite sign over a high frequency range. A DFLC material is usually defined by a threshold voltage $V_{th}$ and a cross-over frequency $f_c$. The cross-over frequency $f_c$ corresponds to a null anisotropy and separates the low frequency range from the high frequency range. A DFLC material usually works in only two modes: low frequency and high frequency.

According to the present disclosure, the DFLC host material is selected to exhibit a low cross-over frequency $f_c$, preferably inferior to 10 kHz. The DFLC host material is also selected to have a low threshold voltage, around 50 V to 100 V.

The liquid crystal mixture 2 also comprises a chiral dopant. The DFLC host material and chiral dopant nature and relative amount are selected depending on the application and the targeted wavelength range and incidence light condition.

The chiral dopant is selected to have a high twisting power (HTP) and a low temperature dependency. For example, chiral dopant is R-5011, that has a HTP≈100 $\mu m^{-1}$.

Thus, the DFLC material is modified to adopt the helical configuration of cholesteric liquid crystals.

It derives from the present disclosure that the liquid crystal mixture 2 may operate in more than two modes, namely in an Off mode, a high frequency mode, a low frequency mode and/or an intermediate mode.

Let us consider an OFF mode schematically illustrated on FIG. 1A. In the Off mode, the controller 5 applies no voltage or a null voltage to the liquid crystal cell 1. In the Off mode, the liquid crystal mixture 2 has a helical periodic structure, with a helix pitch $P_0$ and a helical axis transverse to the surface of the electrodes 13, 14. In this configuration, the liquid crystal molecules long axes are parallel to the electrodes 13, 14 and the long axis direction of the LC molecules turns progressively along a helix from the first electrode 13 to the second electrode 14. In other words, the liquid crystal mixture 2 has a planar structure in the off mode. Such liquid crystal configuration enables to selectively reflect a Bragg reflection wavelength, hereinafter the reference Bragg reflection wavelength. In a cholesteric liquid crystal, the Bragg reflection wavelength is given by $\lambda = <n> \cdot P_0$ where $<n>$ is the average refractive index of the liquid crystal mixture 2 and $P_0$ is the helix pitch. The average refractive index $<n>$ depends on the LC host material. The helix pitch $P_0$ depends on the chiral dopant. The reflection bandwidth is defined by $\Delta\lambda = P_0 (n_e - n_o)$ where $n_e$ is the extraordinary optical refractive index of the liquid crystal host material and respectively $n_o$ is the ordinary optical refractive index of the liquid crystal host material. Thus, the reflection bandwidth can be tuned by changing the pitch $P_0$.

The DFLC material is selected to have a low birefringence, for example smaller than 0.2. As an example, the liquid crystal host is W1978C distributed by MUT, Military University of Technology, Warsaw, Poland, of $\Delta n = 0.1233$ at a wavelength of 589 nm.

As another example the liquid crystal host is W-1831A distributed by MUT, Military University of Technology, Warsaw, Poland.

The amount of chiral dopant is determined to obtain a pitch length of the cholesteric LC that reflect a selected Bragg wavelength under no applied voltage.

In the off mode, the electrodes 13, 14 are in open circuit. In other words, there is no applied voltage, or a null voltage or a voltage lower than the threshold voltage at a frequency higher than fc. The liquid crystal mixture 2 of the liquid crystal cell 1 reflects light at the reference Bragg wavelength determined by the designed pitch $P_0$. Alternatively, the liquid crystal cell may reflect light at the reference Bragg wavelength of the off mode, if a voltage lower than the threshold voltage is applied at a frequency higher than fc, or if a voltage higher than the threshold voltage is applied at a frequency greater than $f_H$ defined below.

In an application, the optical filter device is configured to have a reference Bragg reflection wavelength in the blue to near UV range, between 400 nm and 440 nm, when no voltage is applied.

Let us consider now a high frequency mode. In the high frequency mode, the controller 5 applies a voltage V that is modulated at a frequency in the high frequency range that extends above a high frequency limit $f_H$. The high frequency limit $f_H$ is larger than the cross-over frequency $f_c$. Preferably, the high frequency limit $f_H$ is lower than 100 kHz. In the high frequency mode, the LC molecules of the LC cell 1 tend to stay in the planar configuration. As a result, the Bragg reflection wavelength stays at the same position as in the off mode without any applied voltage. Thus, the liquid crystal cell 1 has, in the high frequency mode, a Bragg reflection wavelength of similar value than the reference Bragg reflection wavelength.

Figure 1B:
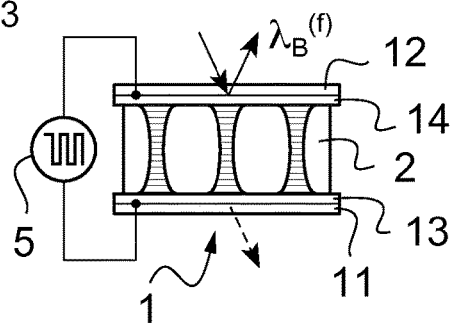

Let us consider now a first Bragg reflection mode schematically illustrated on FIG. 1B. In the first Bragg reflection mode, the controller 5 applies a voltage V that is higher than the threshold voltage Vth and the applied voltage V is modulated at a frequency f in an intermediate frequency range, that is higher than the cross-over frequency $f_c$ and lower than the high frequency limit $f_H$. As the applied frequency f is lowered compared to the high frequency range, the LC molecules rearrange and the helices of the cholesteric structure start to unwind. As the LC molecules unwind, the cholesteric pitch is increased. Hence, the reflected light has a first Bragg reflection wavelength that is also increased compared to the reference Bragg reflection wavelength.

When the applied voltage is switched off, the LC device returns to the Off mode configuration with a planar structure reflecting at the reference Bragg reflection wavelength.

Remarkably, the LC cell is non scattering in the Off mode, in the high frequency mode and also in the first Bragg reflection mode.

It should be understood that the first Bragg reflection mode is, as far as the inventors are aware, not disclosed and not sought after. Indeed, the first Bragg reflection mode is in-between the crossover frequency $f_C$ and the high frequency $f_H$. Further, near the crossover frequency $f_C$ the liquid crystal molecules are in focal conic state which is highly diffusing of light. There is thus generally the impression that between the homeotropic mode, which is transparent, and the high frequency mode, which is transparent with a Bragg reflection, is present an intermediate uncontrolled non-transparent state.

Indeed, unless a liquid crystal mixture is improved to increase the frequency range between the crossover frequency $f_C$ and the high frequency $f_H$, said frequency range is often small when compared to the frequency value and thus not easily detectable, even if still usable for the invention.

As will be illustrated below, one aspect of the invention is to use a specific part of the above-mentioned so-called uncontrolled state, and another aspect of the invention is to enlarge the frequency range between the crossover frequency and the high frequency to stabilize and facilitate controlling the behavior of the liquid crystal mixture with the intermediate mode.

Figure 1C:
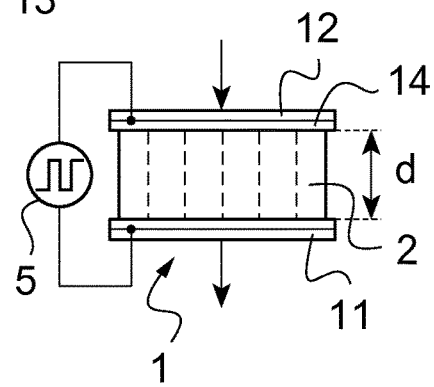

Let us consider now a low frequency mode, schematically illustrated on FIG. 1C. In the low frequency mode, the controller 5 applies a voltage V that is higher than the threshold voltage $V_{th}$ modulated at a frequency in a low frequency range, i.e. lower than the cross-over frequency $f_c$. In the low frequency mode, the liquid crystal mixture 2 switches to a homeotropic structure, the LC molecules being aligned perpendicularly to the surface of the electrodes 13, 14. When the cholesteric liquid crystal mixture has a homeotropic structure, there is no Bragg reflection, all the wavelengths are transmitted. Moreover, this configuration is also non-scattering in transmission in the low frequency mode.

Figure 2:
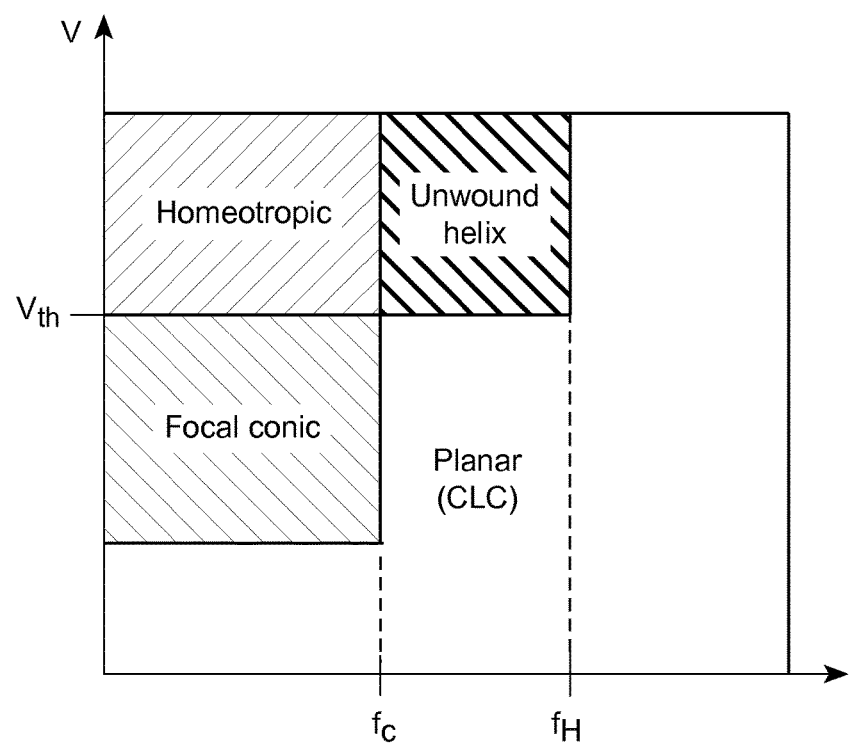
FIG. 2 schematically represents the different states of the dual frequency liquid crystal mixture of the invention as a function of applied voltage (V) and frequency of the applied voltage.

FIG. 2 summarizes schematically the different operating modes of a LC cell according to the present disclosure. The LC mixture has a planar structure in the Off mode, when no voltage is applied to the electrodes, when the applied voltage V is lower than the threshold voltage Vth and modulated at a frequency f in an intermediate frequency range, that is higher than the cross-over frequency $f_c$ and lower than the high frequency limit $f_H$, and, respectively in the high frequency range, when the voltage is modulated at a frequency higher than the high frequency limit $f_H$. The LC mixture has a homeotropic structure in the low frequency mode, when the applied voltage V is higher than the threshold voltage $V_{th}$ and the applied voltage V is modulated at a frequency f in the low frequency range, that is lower than the cross-over frequency $f_c$. The LC mixture has a focal conic structure when the applied voltage V is not null but lower than the threshold voltage Vth and modulated at a frequency f in the low frequency range. And the LC mixture has an unwound planar structure in the first Bragg reflection mode, when the applied voltage V is higher than the threshold voltage Vth and the applied voltage V is modulated at a frequency f in an intermediate frequency range, that is higher than the cross-over frequency $f_c$ and lower than the high frequency limit $f_H$. In contrast with prior art Cholesteric liquid crystal devices, the optical filter does not exhibit a focal conic structure when passing from the planar structure or from the unwound planar to the homeotropic structure and inversely, thanks to the frequency/voltage driving control.

Thus, the optical filter of the present disclosure has no scattering in transmission and reflection even during transition from one mode to the other mode.

FIG. 3B shows an optical filter device 10 according to an embodiment.

The LC mixture comprises W1978C as the DFLC host material and R-5011 as the chiral dopant. The amount of chiral dopant R-5011 in this particular configuration is 4.0% in the liquid crystal W1978C and the cell gap in this example is 3 μm.

The reflectance R and/or transmittance T of the device of FIG. 3B are measured as a function of wavelength using a spectrophotometer.

The optical filter device 10 is designed to reflect in the blue-near UV at a Bragg reflection wavelength of about 440 nm when no voltage is applied.

FIG. 3A shows the maximum reflection peak wavelength as a function of the applied frequency f under a fixed applied voltage, for unpolarized light under normal incidence. As seen on FIG. 3A, under an applied voltage, the Bragg reflection wavelength varies from the 440 nm in the UV up to green wavelengths of about 550 nm when the applied frequency changes from 9 kHz to 2 kHz. More precisely, the Bragg reflection wavelength is approximately equal to 440 nm when the applied frequency varies between 5 kHz and 9 kHz. And the Bragg reflection wavelength increases from 440 nm to 550 nm when the applied frequency decreases from 5 kHz to 2 kHz. No Bragg reflection is observed when the applied frequency is lower than 2 kHz.

Thus the Bragg reflection wavelength is variable within a range of about 100 nm.

FIG. 3C shows a microscope image of the LC device 10 as seen between crossed polarizers in reflection and the corresponding transmission curve of the LC device under an applied voltage of 90V, above the threshold voltage, modulated at a frequency f of 2.5 kHz. The device reflects light around 550 nm and appears green in reflection. The transmission curve has a band-stop shape with a minimum transmittance at the Bragg wavelength around 550 nm. Light is transmitted at other wavelengths without the appearance of focal conic state.

FIG. 3D shows a microscope image and the corresponding transmission curve of the same LC device 10 under an applied voltage modulated at a frequency f of 5 kHz. The device reflects light around 500 nm and appears blue in reflection. Similarly, the transmission curve has a band-stop shape with a minimum transmittance at the Bragg wavelength around 500 nm. Light is transmitted at other wavelengths without the appearance of focal conic state.

FIG. 3E shows a microscope image and the corresponding transmission curve of the same LC device 10 under an applied voltage modulated at a frequency f of 10 kHz. The device reflects light around 440 nm and appears dark violet in reflection. Similarly, the transmission curve has a band-stop shape with a minimum transmittance at the Bragg wavelength around 440 nm. Light is transmitted at other wavelengths without the appearance of focal conic state.

A second example of optical filter device uses W-1831A as the DFLC host material and R-5011 as the chiral dopant, with a cell gap of 3 μm, as illustrated on FIGS. 4A-4E. In this second example, the optical filter device 10 is designed to reflect in the blue range at a Bragg reflection wavelength of about 450-460 nm when no voltage is applied.

FIG. 4A shows the maximum reflection peak wavelength as a function of the applied frequency f under a fixed applied voltage, for unpolarized light under normal incidence. As seen on FIG. 4A, under an applied voltage, the Bragg reflection wavelength varies from the 450 nm in the blue range up to wavelengths of about 520 nm when the applied frequency changes from 25 kHz to 7 kHz. More precisely, the Bragg reflection wavelength is approximately equal to 455 nm when the applied frequency varies between 15 kHz and 25 kHz. And the Bragg reflection wavelength increases from 455 nm to 520 nm when the applied frequency decreases from 15 kHz to 6 kHz. No Bragg reflection is observed when the applied frequency is lower than 6 kHz. Thus the Bragg reflection wavelength is variable within a range of about 70 nm in this second example.

FIG. 4B shows a microscope image of the LC device 10 as seen between crossed polarizers in reflection and the corresponding transmission curve of the LC device under an applied voltage of 90V, above the threshold voltage, modulated at a frequency f of 6 kHz. The device reflects light around 520 nm and appears green in reflection.

FIG. 4C shows a microscope image and the corresponding transmission curve of the same LC device 10 under an applied voltage modulated at a frequency f of 8 kHz. The device reflects light around 500 nm and appears light green in reflection. Similarly, the transmission curve has a band-stop shape with a minimum transmittance at the Bragg wavelength around 500 nm. Light is transmitted at other wavelengths without the appearance of focal conic state.

FIG. 4D shows a microscope image and the corresponding transmission curve of the same LC device 10 under an applied voltage modulated at a frequency f of about 10 kHz. The device reflects light around 480 nm and appears blue-green in reflection. Similarly, the transmission curve has a band-stop shape with a minimum transmittance at the Bragg wavelength around 480 nm. Light is transmitted at other wavelengths without the appearance of focal conic state.

FIG. 4E shows a microscope image of the LC device 10 as seen between crossed polarizers in reflection and the corresponding transmission curve of the LC device under an applied voltage of 90V, above the threshold voltage, modulated at a frequency f of 20 kHz. The device reflects light around 455 nm and appears blue in reflection. The transmission curve has a band-stop shape with a minimum transmittance at the Bragg wavelength around 455 nm. Light is transmitted at other wavelengths without the appearance of focal conic state.

Depending on the selected DFLC material, chiral dopant material and relative proportions, the reference Bragg wavelength and the variable refection wavelength may be adjusted according to the application.

A similar optical filter can be designed for shifting the reflected wavelength from the blue range to the yellow range.

Thus, we obtain an active optical filter that has an electrically tunable Bragg reflection wavelength. The reflection wavelength varies as a function of the frequency of applied voltage. Advantageously, the frequency range is limited to relatively moderate frequencies from 0 to about 10 kHz or few tens of kHz. The optical filter does not require a modulation frequency in the MHz range.

According to a particular and advantageous embodiment, the optical filter device comprises two LC cells arranged in a stack, each LC cell having a determined variable reflection range. Such an arrangement enables to enlarge the wavelength tuning range. A first LC cell is configured to shift the reflectance peak in the range of lower wavelengths, and the second LC cell is configured to shift the reflectance peak in the range of higher wavelengths. For example, the first LC cell is adapted for a first reflection wavelength in the UV-green range and the second LC cell is adapted for a second reflection wavelength in the blue-yellow.

In a variant, the optical filter device comprises two LC cells arranged in a stack, the first LC cell being right-handed and the second LC cell being left-handed. The first LC cell has a first Bragg reflection wavelength with a determined spectral bandwidth (FWHM) and the second LC cell has a second Bragg reflection wavelength. The shift between the first Bragg reflection wavelength and the second Bragg reflection wavelength is less than the FWHM. This arrangement enables to reduce the spectral bandwidth of the optical filter device comprising two LC cells to less than the spectral bandwidth of a single LC cell.

In another variant, the optical filter device comprises two LC cells arranged in a stack, the first LC cell being right-handed and the second LC cell being left-handed. The first LC cell and the second LC cell are configured to have the same reflectance peak. Since each LC cell has an efficiency in reflection of 50% for unpolarized light, this arrangement enables to increase the efficiency in reflection.

In an application, such an optical filter can be used as an active therapeutic filter under normal incidence and unpolarized light. The active therapeutic filter is based on a variable band-stop LC filter as disclosed herein, the LC filter having a UV-only cut mode enabling color perception and/or UV protection and having a tunable selective spectral band that can be electrically shifted in the blue range as desired from bad blue to good blue.

In another application, the active optical filter can be used as a tunable reflection filter for confocal microscopy operating under 45 deg. incidence angle and circularly polarized light. As an example, such a tunable reflection filter is configured to switch between several excitation laser wavelengths, for instance at 405 nm, 488 nm, 560 nm and/or 640 nm. One or two tunable dichroic filters advantageously replace a plurality of dichroic mirrors used for fluorescence detection of different dyes in a conventional confocal microscope.

FIGS. 5 and 6 show simulations of transmittance curves for optical filters according to the present disclosure. The simulations are obtained using a commercially available simulation software LCDMaster 1D (Shintech). In LCD master 1D, the dual frequency cholesteric LC is simulated as a nematic liquid crystal, that exhibits the same features as the dual frequency LC under no applied voltage, with some twist.

More precisely, the W1978C mixture (from MUT, Military University of Technology) is modelled as a LC with positive anisotropy ($\Delta\varepsilon=1.85$ with $\varepsilon_e=7.91$, $\varepsilon_o=6.06$) and refractive indices at 589 nm of $n_e=1.6039$ and $n_o=1.4806$.

The twist is chosen such that:

$$\text{Twist}=\text{pre-twist}+(d/p)\times 360$$

where p is the pitch that is determined to obtain a Bragg reflection at 405 nm in the Off mode.

Depending on the applications:
for therapeutic filters, under normal incidence:

$$p = \frac{\lambda_B}{n_{average}} = 263 \text{ nm}$$

For confocal applications, under θ=27.3 deg. angle of incidence (AOI) in the material (equivalent to 45 deg. AOI in the air)

$$p = \frac{\lambda_B}{n_{average} \times \cos(\theta)} = 295.5 \text{ nm}$$

where d is the cell gap value, that is chosen equal to 15 pitches that corresponds to 3.94 μm for therapeutic filters and 4.43 μm for confocal applications.

The pre-twist value is considered as equal to 0 as rubbing conditions are supposed to be perfect on the substrate.

The effect of decreasing the applied frequency f on the LC device is modelled by keeping the same thickness for the LC cell and removing 0.5 pitches to the system at each step, i.e. at each applied frequency. In other words, only the half-pitch loss mechanism is taken into account for this simulation.

FIG. 5 shows simulations of transmittance curves as a function of the wavelength for a LC cell having a cell gap of 3.94 μm and at several pitch values (from 15 pitches to 11 pitches by step of 0.5 pitch) for unpolarized light under normal incidence.

The simulations of FIG. 5 show that a LC device based on a single LC cell can switch the reflected Bragg wavelength from 405 nm with a spectral bandwidth of 35 nm, to 435 nm with a spectral bandwidth of 40 nm and to 485 nm with a spectral bandwidth of 50 nm. Such a filter can be used as an active therapeutic filter. Using one cell, the maximum reflectance is 50% for unpolarized light and transmittance is 91%. Transmission losses in the simulation are only due to Fresnel reflection coefficients at the interfaces air/material/air and they can be reduced.

FIG. 6 shows simulation of transmittance curves as a function of the wavelength for a for a LC cell having a cell gap of 4.43 μm and at several pitch values (from 15 pitches to 11 pitches by step of 0.5 pitch) for circular polarized light under 45 degrees angle of incidence.

The simulations of FIG. 6 show that a LC device based on a single LC cell can switch the reflected Bragg wavelength from 405 nm with a spectral bandwidth of 40 nm, to 488 nm with a spectral bandwidth of 60 nm under 45 deg. angle of incidence. Using one cell, the maximum reflectance is 50% for right circular polarized light and transmittance is 88.7%. Transmission losses in the simulation are only due to Fresnel reflection coefficients at the interfaces air/material/air under oblique incidence and they can be reduced.

The simulation results illustrated on FIGS. 5 and 6 correspond to an ideal case. In practice, there is a loss of transmission in the actual measurements when shifting the wavelengths Also experimentally, in the low frequency range, for example at frequencies below 5 kHz, there is a loss of reflectance efficiency that is not due to focal conic state but to the bending of the helices. The loss of efficiency is halved at 2 kHz. The simulation of FIGS. 5 and 6 do not take into account the bending of the helices, only the untwisting.

The invention claimed is:

1. An optical filter comprising:
    a liquid crystal cell comprising two electrodes, facing each other, each of the two electrodes being covered by an alignment layer, and separated by a cell gap and a cholesteric liquid crystal mixture inserted between the two electrodes;
    the liquid crystal cell being configured to apply a voltage between the two electrodes;
    the cholesteric liquid crystal mixture comprises a chiral dopant and a dual frequency liquid crystal host material, wherein the chiral dopant has a helical twisting power higher than or equal to 100 $\mu m^{-1}$, the dual frequency liquid crystal host material has a refractive index birefringence lower than 0.2 in the visible range, the dual frequency liquid crystal host material having a cross-over frequency lower than 10 kilohertz,
    the liquid crystal cell having a reference Bragg reflection mode with a planar structure and a reference Bragg reflection wavelength in the spectral range between 300 nm and 900 nm when the applied voltage is null and when the applied voltage is modulated at a frequency higher than a high frequency limit, wherein
    the cholesteric liquid crystal mixture has a high frequency range where the liquid crystal mixture has a dielectric anisotropy that is independent from frequency and negative, the high frequency range extending above the high frequency limit, the high frequency limit being lower than 100 kHz, and
    the liquid crystal cell has a first Bragg reflection mode with an unwound planar structure and a first Bragg reflection wavelength, when the applied voltage is higher than a threshold voltage, the threshold voltage being lower than 100 V, and the applied voltage is modulated at another frequency comprised in an intermediate frequency range which is above the cross-over frequency and below the high frequency limit, where the liquid crystal mixture has a dielectric anisotropy that varies with frequency and is negative, and the first Bragg reflection wavelength being different from the reference Bragg reflection wavelength.

2. The optical filter according to claim 1, wherein the dual frequency liquid crystal host material has a cross-over frequency lower than 5 kHz.

3. The optical filter according to claim 1, wherein the liquid crystal cell is adapted to be controlled by a controller, so as to operate at least in the first Bragg reflection mode under an applied voltage above the threshold voltage, modulated at a first predetermined frequency comprised in the intermediate frequency range, the liquid crystal mixture having a planar structure in a high frequency mode, wherein the applied voltage is higher than the threshold voltage and the frequency of applied voltage is in the high frequency range, the liquid crystal cell in the high frequency mode having a Bragg reflection wavelength equal to the reference Bragg reflection wavelength.

4. An optical filter device comprising a first optical filter and a second optical filter according to claim 1, the first optical filter having a predetermined first Bragg reflection wavelength, and the second optical filter having a predetermined second Bragg reflection wavelength, the first optical filter and the second optical filter being arranged optically in series.

5. The optical filter device according to claim 4, wherein the first optical filter and the second optical filter differ either by optical handedness or by a value of their respective Bragg reflection wavelengths.

6. An optical device comprising the optical filter according to claim 1, and a controller configured to control the optical filter at least in the first Bragg reflection mode and, respectively, in one of an off mode and of a high frequency mode according to which, in the off mode, the controller applies no voltage to the electrodes, the liquid crystal cell having, in the off mode, the reference Bragg reflection wavelength, and, respectively, in the high frequency mode, the controller applies a voltage above the threshold voltage that is modulated at a frequency in the high frequency range, the liquid crystal cell having, in the high frequency mode, a Bragg reflection wavelength of similar value than the reference Bragg reflection wavelength and wherein, in the first Bragg reflection mode, the controller applies a voltage above the threshold voltage that is modulated at a first predetermined frequency comprised in the intermediate frequency range so that the liquid crystal cell has a first predetermined Bragg reflection wavelength.

7. The optical device according to claim 6, wherein the controller is further configured to control the optical filter in the first Bragg reflection mode, and wherein the controller applies a voltage above the threshold voltage modulated at a second predetermined frequency in the intermediate frequency range so that the liquid crystal cell has a second predetermined Bragg reflection wavelength, the second predetermined frequency being different from the first predetermined frequency, and the second Bragg reflection wavelength being different from the first predetermined Bragg reflection wavelength.

8. The optical device according to claim 7, wherein, in the off mode, the reference Bragg reflection wavelength is in the UV range and, respectively, in the first Bragg reflection mode, the first Bragg reflection wavelength is in the 380-780 nm range.

9. The optical device according to claim 7, further comprising an optical component having an optical power arranged in series with the optical filter.

10. The optical device according to claim 7, the optical device comprising a pair of eyeglasses or a lens.

11. The optical device according to claim 6, wherein, in the off mode, the reference Bragg reflection wavelength is in the UV range and, respectively, in the first Bragg reflection mode, the first Bragg reflection wavelength is in the 380-780 nm range.

12. The optical device according to claim 11, further comprising an optical component having an optical power arranged in series with the optical filter.

13. The optical device according to claim 11, the optical device comprising a pair of eyeglasses or a lens.

14. The optical device according to claim 6, further comprising an optical component having an optical power arranged in series with the optical filter.

15. The optical device according to claim 6, the optical device comprising a pair of eyeglasses or a lens.

16. The optical filter according to claim 1, wherein the chiral dopant comprises (13bR)-5,6-Dihydro-5-(trans-4-propylcyclohexyl)-4H-dinaphtho[2,1-f:1',2'-h][1,5]dioxonin.

17. A method for tuning a reflection wavelength in an optical filter comprising:
 providing a cholesteric liquid crystal mixture in sandwich between two electrodes in a liquid crystal cell, each of the two electrodes being covered by an alignment layer, the cholesteric liquid crystal mixture comprising a chiral dopant and a dual frequency liquid crystal host material, wherein the chiral dopant has a helical twisting power higher than or equal to 100 $\mu m^{-1}$, the dual frequewncy liquid crystal host material having a refractive index birefringence lower than 0.2 in the visible range, the dual frequency liquid crystal host material having a threshold voltage lower than 100 V and a cross-over frequency lower than 10 kilohertz, defining an intermediate frequency range, above the cross-over frequency, where the liquid crystal mixture has a dielectric anisotropy that varies with frequency and is negative, and a high frequency range above the intermediate frequency range where the liquid crystal mixture has a dielectric anisotropy that is independent from frequency and negative, the high frequency range extending above the high frequenct limit, the high frequency limit being lower than 100 kHz, the liquid crystal cell having a reference Bragg reflection wavelength in the 300-900 nm range;
 in an off mode, applying to the electrodes no voltage or a voltage modulated at a frequency in the high frequency range, such that the liquid crystal cell has the reference Bragg reflection wavelength while the cholesteric liquid crystal mixture is non-scattering in transmission at other wavelengths; and
 in a first predetermined mode, applying a voltage above the threshold voltage modulated at a first frequency in the intermediate frequency range such that the liquid crystal cell has a first Bragg reflection wavelength that varies as a function of the first frequency while the cholesteric liquid crystal mixture is non-scattering in transmission at other wavelengths, the first Bragg reflection wavelength being different from the reference Bragg reflection wavelength.

18. The method according to claim 17, further comprising at least one of:
 in a low frequency mode, applying a voltage higher than the threshold voltage modulated at a frequency in a low frequency range lower than the cross-over frequency so as to switch the liquid crystal mixture into a homeotropic structure that has no Bragg reflection while the cholesteric liquid crystal mixture is non-scattering in transmission in the low frequency mode;
 in a second predetermined mode, applying a voltage higher than the threshold voltage modulated at second frequency in the intermediate frequency range such that the liquid crystal cell has a second Bragg reflection wavelength that is a function of the second frequency while the cholesteric liquid crystal mixture is non-scattering in transmission at other wavelengths, the second Bragg reflection wavelength being different from both the first Bragg reflection wavelength and the reference Bragg reflection wavelength.

\* \* \* \* \*